United States Patent [19]

Byram

[11] 3,809,876

[45] May 7, 1974

[54] APPARATUS FOR THE GENERATION OF BESSEL FUNCTION SIGNALS

[75] Inventor: George W. Byram, San Diego, Calif.

[73] Assignee: The United States of America as represented by the Secretary of the Navy, Washington, D.C.

[22] Filed: Aug. 31, 1973

[21] Appl. No.: 393,685

[52] U.S. Cl. .................. 235/197, 235/152, 235/181

[51] Int. Cl. .................. G06g 7/26

[58] Field of Search ........... 235/197, 152, 181, 194, 235/195, 196; 343/100 CL

[56] References Cited

UNITED STATES PATENTS

| | | | |
|---|---|---|---|
| 3,355,736 | 11/1967 | Perper | 235/181 UX |
| 3,598,982 | 8/1971 | Lawrence | 235/197 |
| 3,665,171 | 5/1972 | Morrow | 235/197 X |

*Primary Examiner*—Joseph F. Ruggiero
*Attorney, Agent, or Firm*—Richard S. Sciascia; Ervin F. Johnston; John Stan

[57] ABSTRACT

Apparatus for the generation of Bessel function signals $J_\nu(z)$ of the first kind, of constant argument $z$ and successive integral order $\nu$, comprising a first signal source capable of generating signals of arbitrary amplitude $J_\nu(z)$, where $z$ is a constant. Means are connectable to the signal source for multiplying the values of $J_\nu(z)$ by the quantity $(2\nu/z)$. A second signal source is capable of generating signals of amplitude $J_{\nu-1}(z)$. An inverter is connected to, and inverts a signal at, the output of the second signal source. The transit time of the $J_\nu(z)$ signal traversing the multiplying means is substantially equal to the transit time of the $J_{\nu-1}(z)$ signal traversing the inverter. The apparatus further comprises a summing circuit, whose two inputs are the output of the multiplying means, $(2\nu/z)\,J_\nu(z)$, and the output of the inverter $-J_{\nu-1}(z)$, the output of the summing circuit thereby being $(2\nu/z)\,J_\nu(z) - J_{\nu-1}(z)$, which is equal to $J_{\nu+1}$.

After the first and second signal sources are once energized, means are provided so that the action becomes automatically recursive, without the necessity of again energizing the signal sources.

5 Claims, 9 Drawing Figures

BESSEL FUNCTION GENERATOR USING DELAY LINES

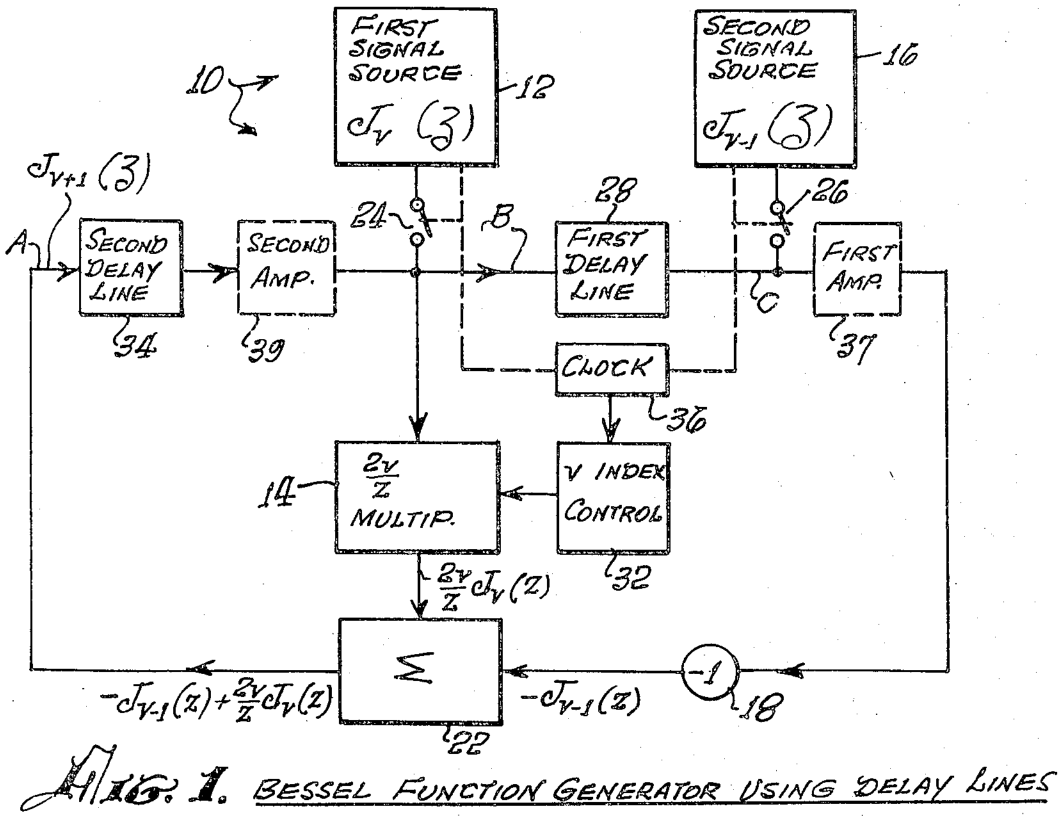
FIG. 1. BESSEL FUNCTION GENERATOR USING DELAY LINES
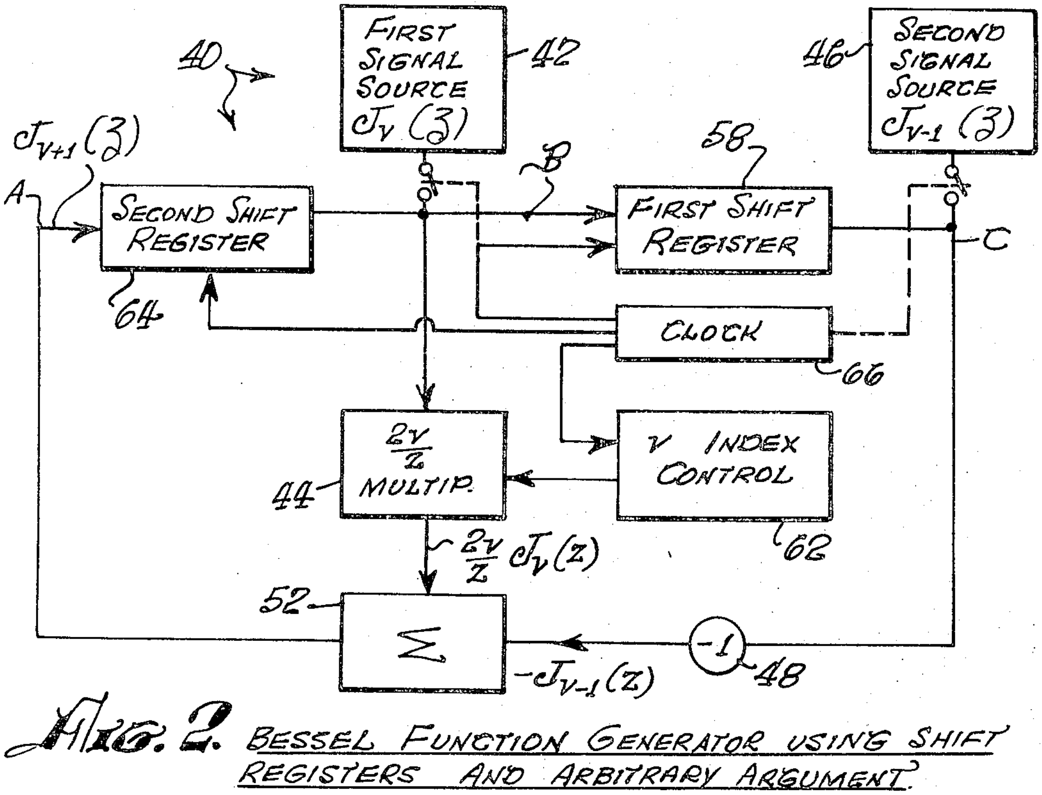
FIG. 2. BESSEL FUNCTION GENERATOR USING SHIFT REGISTERS AND ARBITRARY ARGUMENT

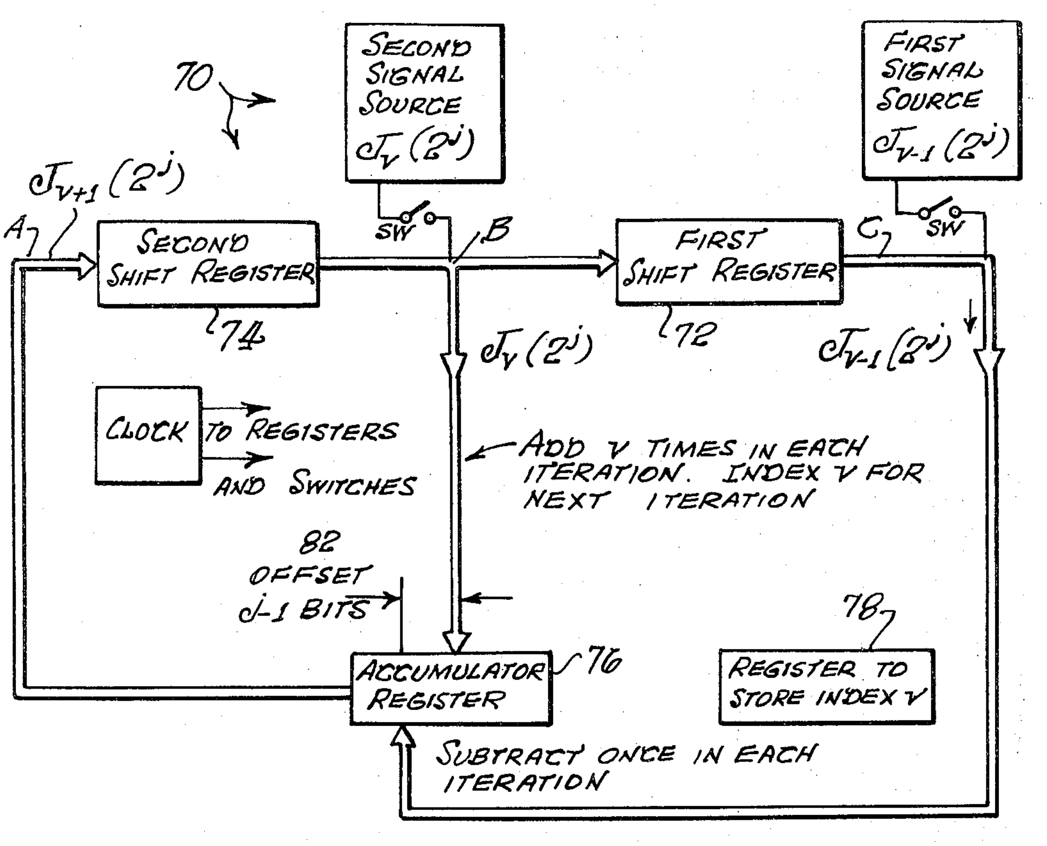
FIG. 3. BESSEL FUNCTION GENERATOR USING SHIFT REGISTERS AND A POWER OF 2, ($2^j$), ARGUMENT
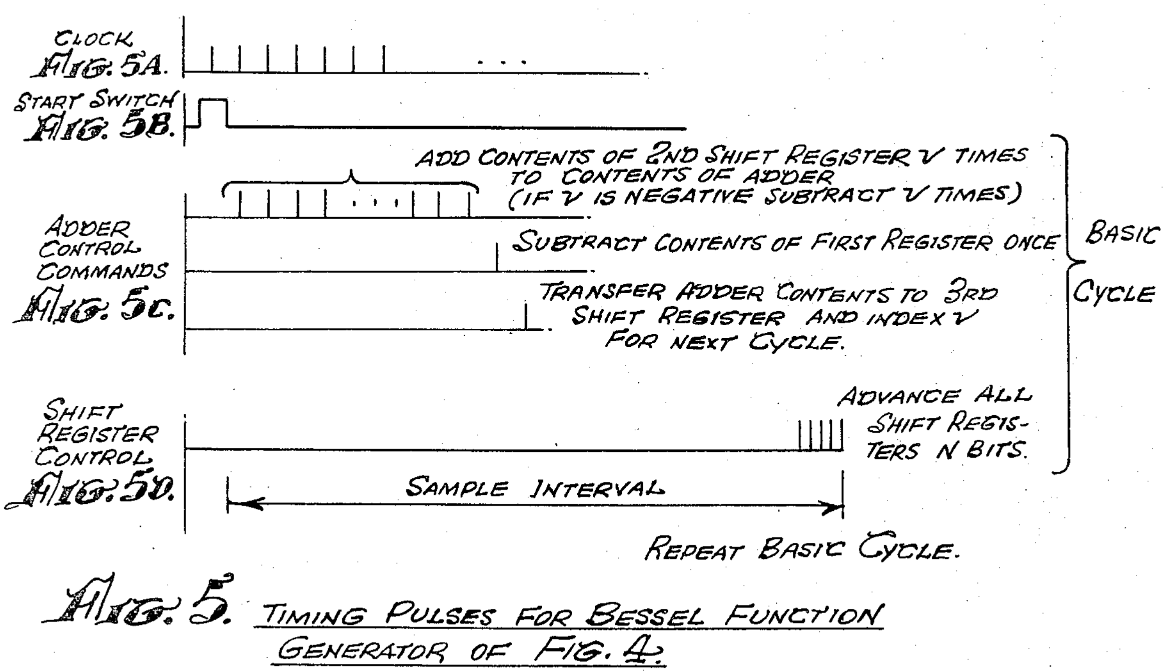
FIG. 5A. FIG. 5B. FIG. 5C. FIG. 5D.
FIG. 5. TIMING PULSES FOR BESSEL FUNCTION GENERATOR OF FIG. 4.

CIRCUIT DIAGRAM OF BESSEL FUNCTION GENERATOR OF FIG. 3.

APPARATUS FOR THE GENERATION OF BESSEL FUNCTION SIGNALS

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

Field of the Invention

This invention relates to a signal generator for a class of signals consisting of a sequence of values corresponding to Bessel functions of constant argument indexed by order. A typical example of such a signal would be the sequence of amplitudes $J_{-\nu}(z)$, $J_{-\nu+1}(z), J_{-\nu+2}(z), \ldots, J_0(z), J_1(z), \ldots, J_\nu(z)$, where $J_\nu(z)$, for example, is the Bessel function of order $\nu$ and argument $z$. Here z is a constant.

The apparatus of this invention is useful in an echo location system, which is a system which determines the location of a target, by sending a transmitted signal and then determining what the time delay is between the instant at which the transmitted signal, often a pulse, was transmitted and the time at which the echo from a scatterer is received. Echo location is a general term for both radar and sonar. Scatterers comprise the target, or targets, and anything else that scatters back to the receiver some of the signal energy.

A Bessel function is a function of two variables, an argument and an index. Normally, the variable of interest is the argument. However, the sequences of interest in this invention are different from the conventional Bessel type sequences in that all terms in the sequence are functions of only one argument, designated z herein, the index $\nu$ being the variable.

There are some similarities that the signals generated by the apparatus of this invention have to chirp signals. Both have sharp autocorrelation functions, hence they are excellent echo-location signals. However, a conventionally generated chirp signal requires amplitude shading. A chirp of infinite length has a perfect autocorrelation function, however, since in any physical realization the length has to be truncated, then amplitude shading is required.

The Bessel sequences of this invention also have a substantially perfect autocorrelation function. Generally, truncation is not required. The effects of truncation are small because the signal amplitude is small for large positive or negative values of the order. The effects of extreme truncation, however are not negligible. Moreover, the amount of truncation desired can be easily determined. If the argument is small, the zero index term is large, and terms involving other indices are very small comparatively. As the argument increases, the number of significant terms increases more or less linearly with the argument. Once the argument becomes larger than approximately 2 or 3, the number of terms required for satisfactory correlation equals approximately 1.3 times the argument.

Beyond the critical number proportional to the argument, the terms get small very rapidly, decaying faster than exponentially or than Gaussian, and that is why the effect of truncating terms is negligible.

In some numerical calculations performed the largest term was set at 10,000, and rejecting any terms less than one resulted in sidelobes in the autocorrelation function that were reduced 80db from the main lobe. In practice it is very difficult to realize an implementation where the sidelobes are reduced even as much as 40db.

A Bessel function signal is an optimum signal for that case in which there is no doppler, that is, it provides a perfect autocorrelation function for a pure range path, a path which is not varying with time. Now this is the type of propagation path present, for example, in a surface-wave device if the device is used as a delay line. However, it can also occur in some static sonar systems, where there is no relative motion in range between the signal source and the target.

The great advantage of using the Bessel function sequence generator of this invention is that, by using its recursion properties, it is extremely simple in design, and yet it permits the generation of the desired signal components either forward or backward in time.

It might be desirable to generate the signal components backward in time if it is desired to perform a convolution operation, instead of a correlation. The same hardware can be used for generating either a correlation or convolution function, for example for use as a reference generator.

The signal generated by the apparatus of this invention, if realized in an analog manner, has as one of its properties that its correlation function is an ideal impulse with no sidelobes; if the function can be realized perfectly. If the function is realized in a quantized manner, where the function can be represented only at certain discrete levels, it still has a very useful property of the generation of minimal sidelobes.

DESCRIPTION OF THE PRIOR ART

Prior art methods of generation of the sequences generated by this invention involve the use of long delay lines or shift registers with as many taps as there are samples in the signal sequence. These are complicated and highly specialized devices. A complete change of tap weights is required if the signal is changed. These signals can also be generated by special magnetostrictive delay line devices and special surface wave devices, but the entire structure of the device must be changed if the signal is changed.

With signals that have been used in prior art apparatus, there are signals such as FM chirps and various pseudo-noise (P-N) signals that can give a reasonably good range resolution, although generally significant sidelobes are present when the functions are truncated in the case of chirps. In the case of a P-N signal, the periodic correlation function is satisfactory, but the aperiodic correlation, where the signal is used only once and is not repeated, is not very satisfactory.

The function generated by the apparatus of this invention has the property of being inherently of a fixed length. In other words the length is chosen when the argument of the Bessel function is chosen. The chosen argument determines how many non-zero terms are obtained.

This invention provides a simpler and less costly method of generating Bessel function signals than prior art methods. A single implementation can generate an entire class of signals either forward or backward with only a change of initial conditions and indexing.

A key feature of the generator of this invention is that it utilizes the unique property of this class of signals to permit them to be generated either forward in time or backward in time in a very simple manner, whereas prior art signal generators have generally been limited to more complex structures or to being able to only generate portions of their particular class of signals.

SUMMARY OF THE INVENTION

This invention relates to an apparatus for the generation of Bessel function signals $J_\nu(z)$ of the first kind, of constant argument z and successive integral order $\nu$, comprising a first signal source capable of generating signals of arbitrary amplitude $J_\nu(z)$, where z is a constant. Means are connectable to the signal source for multiplying the values of $J_\nu(z)$ by the quantity $2\nu/z$. A second signal source is capable of generating signals of amplitude $J_{\nu-1}(z)$. An inverter is connected to, and inverts a signal at, the output of the second signal source. The transit time of the $J_\nu(z)$ signal traversing the multiplying means is substantially equal to the transit time of the $J_{\nu-1}(z)$ signal traversing the inverter. The apparatus further comprises a summing circuit, whose two inputs are the output of the multiplying means, $2\nu/z\ J_\nu(z)$, and the output of the inverter, $-J_{\nu-1}(z)$, the output of the summing circuit thereby being $2\nu/z\ J_\nu(z) - J_{\nu-1}(z)$, which is equal to $J_{\nu+1}$.

After the first and second signal sources are once energized, means are provided so that the action becomes recursive, without the necessity of again energizing the signal sources.

OBJECTS OF THE INVENTION

An object of the invention is to provide a novel Bessel function apparatus for generating chirp-type signals suitable for use in sonar and radar.

Another object of the invention is to provide an apparatus for generating chirp-type signals wherein the various components can be generated from two initial signal components, using a recursive relationship.

Yet another object of the invention is to provide a Bessel function apparatus for generating chirp-type signals in either analog or digital form.

Other objects, advantages, and novel features of the invention will become apparent from the following detailed description of the invention, when considered in conjunction with the accompanying drawings, wherein:

BRIEF DESCRIPTION OF THE DRAWINGS

FIG. 1 is a block diagram of a simple Bessel function generator using two delay lines.

FIG. 2 is a block diagram of a Bessel function generator using two shift registers and arbitrary argument for the Bessel function.

FIG. 3 is a similar type of block diagram but using an argument for the Bessel function which is a power of two.

FIG. 5, comprising FIGS. 5A, 5B, 5C, and 5D, is a set of timing pulses for the specific implementation shown in FIG. 4.

DESCRIPTION OF THE PREFERRED EMBODIMENTS

Figure 4:
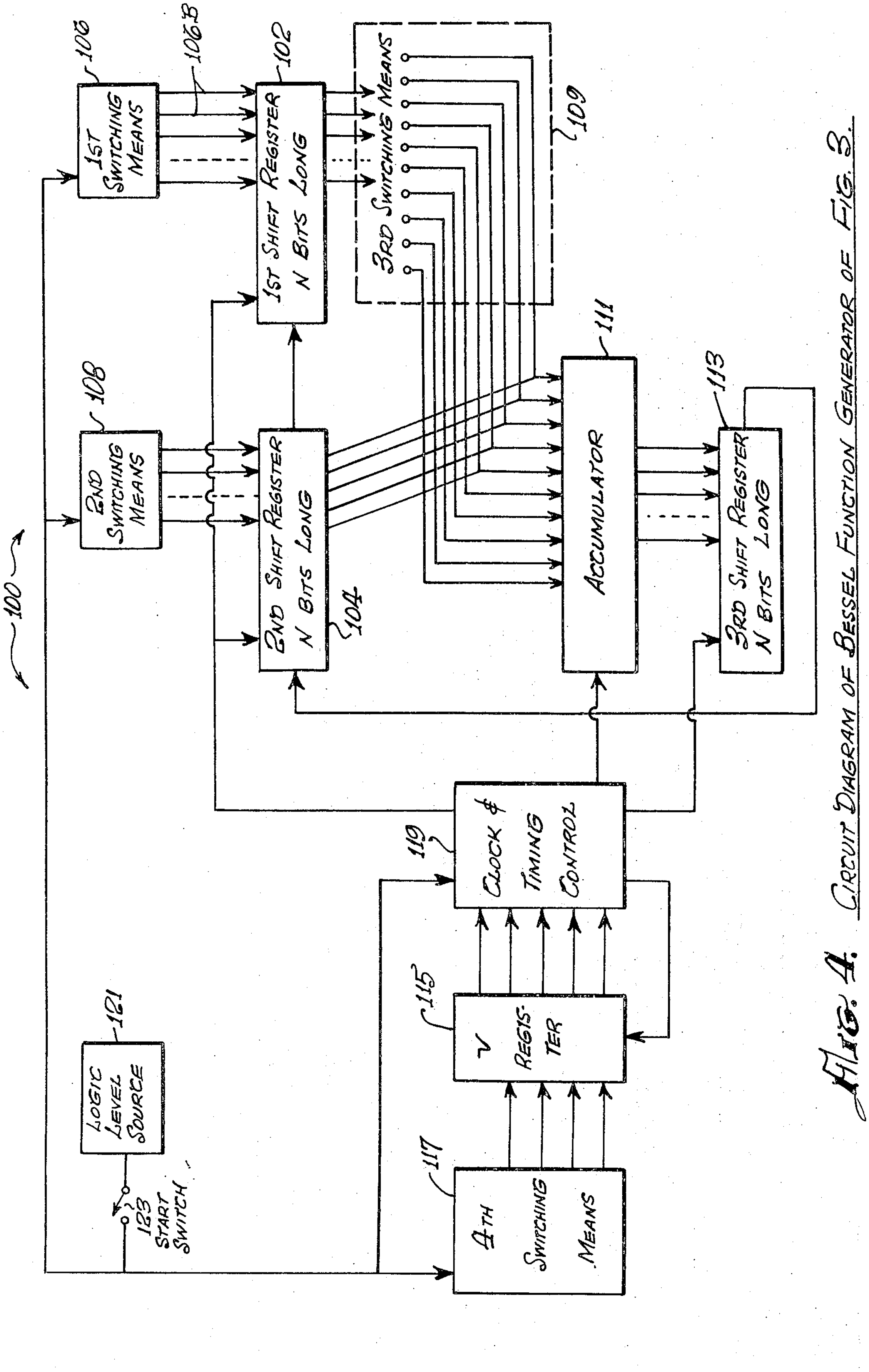
FIG. 4 is a schematic diagram of the implementation shown in FIG. 3 in block form.

Referring now to FIG. 1, therein is shown an apparatus 10 for the generation of Bessel function signals $J_\nu(z)$ of the first kind, of constant argument z and successive integral order $\nu$. In its simplest form the embodiment 10 comprises a first signal source 12 capable of generating signals of arbitrary amplitude $J_\nu(z)$ where z is a constant. Means 14 are connectable to the signal source 12, for multiplying the values of $J_\nu(z)$ by the quantity $(2\nu/z)$. The apparatus 10 also includes a second signal source 16, capable of generating signals of amplitude $J_{\nu-1}(z)$. An inverter 18 is connected to, and inverts a signal at, the output of the second signal source 16.

The transit time of the $J_\nu(z)$ signal traversing the multiplying means 14 is substantially equal to the transit time of the $J_{\nu-1}(z)$ signal traversing the inverter 18. The simplified apparatus 10 further comprises a summing circuit 22, whose two inputs are the output of the multiplying means 14, $2\nu/zJ_\nu(z)$, and the output of the inverter 18, $-J_{\nu-1}(z)$, the output of the summing circuit thereby being $(2\nu/z)\ J_\nu(z) - J_{\nu-1}(z)$, which is equal to $J_{\nu+1}$.

The apparatus 10 thus far described would have limited applicability, since it does not include recursive capability.

Accordingly, in a practical implementation, the apparatus 10 shown in FIG. 1 would further comprise a first and a second normally open switching means 24 and 26, each having an input and an output, whose inputs are connected to the outputs of the first and second signal sources, 12 and 16 respectively.

A first delay line 28 has its input connected to the output of the first switching means 24 and its output connected to the output of the second switching means 26.

The $J_\nu(z)$ signal generated by the first signal source 12, after traversing the first switching means 24 and the delay line 28, replaces the $J_{\nu-1}(z)$ signal at the output of the delay line.

A $\nu$ index control 32 generates successive integral values, either increasing or decreasing, of the order $\nu$, the output of the control being connected to the multiplying means 14. The multiplying means 14 thereby multiplies the values of $J_\nu(z)$ by the factor of $(2\nu/z$, where $\nu$ changes by one unit for each successive multiplication.

A second delay line 34 has its input connected to the output of the summing circuit 22 and its output connected to the input of the first delay line 28, the $J_{\nu+1}(z)$ signal at the output of the summing circuit, after traversing the second delay line, replacing the $J_\nu(z)$ signal at the input of the first delay line.

When the two signal sources 12 and 16 are applied simultaneously the $J_\nu(z)$ signal generated by the first signal source 12 traverses two paths. One path leads directly to the multiplier 14 and the other path leads to the first delay line 28. The output of the second signal source 16 is connected to the input of the inverter 18.

Compared to the transit time of signals through the first or second delay lines 28 and 34, the transit time of signals through the multiplier 14, the inverter 18 and the summer 22 are relatively small, and therefore the signal $[-J_{\nu-1}(z) + (2\nu/z)\ J_\nu(z)]$, which is equal to $J_{\nu+1}(z)$, arrives at the input of the second delay line 34, at point A, at essentially the same time that the $J_\nu(z)$ signal is inserted at point B, ready to enter the first delay line 28.

The apparatus 10 also includes means 36 for timing or clocking the sequence of operations of the apparatus, including, generally in the order enumerated, (1) momentarily energizing the first signal source 12; (2) momentarily energizing the first switching means 24; (3) momentarily energizing the second signal source 16; (4) momentarily energizing the second switching means 26; 5) indexing the $\nu$ index control 32 at a time such that the signal $-J_{\nu-1}(z)$ at the output of the inverter 18 and the $(2\nu/z)\,J_\nu(z)$ signal at the output of the multiplying means 14 appear simultaneously at the input to the summing circuit 22.

With the result that the new output of the summing circuit 22 becomes a $J_{\nu+2}(z)$ signal at the completion of one transversal of the Bessel function signals through the delay lines, 28 and 34, and becomes a $J_{\nu+3}(z)$, $J_{\nu+4}(z)$, . . . , etc., signal with each successive indexing of the $\nu$ index control 32, without the necessity of again energizing the first or second signal sources 12 and 16, or the first or second switching sources, 24 and 26. The apparatus 10 thereby serves as a recursive generator of Bessel function signals $J_\nu(z)$ of the first kind, of constant argument z, and successive integral order $\nu$.

Since each of the two signals representing the two terms in the recursive relationship traverse the two delay lines an equal number of times, then each individual term in the Bessel sequence has the proper shape in any one recursion, but similar terms in successive recursions decrease in magnitude exponentially as time increases.

If there be any significant signal attenuation in the delay lines 28 and 34 in two successive recursions, then amplification of the signal may be required before or after it enters the delay line. There should preferably be a combination of gain and delay such that the delay line approximates an ideal delay line.

Accordingly, the apparatus 10 may further comprise a first amplifier 37, whose input is connected to the output of the first delay line 28 and whose output is connected to the input of the inverter 18. A second amplifier 39 has its input connected to the output of the second delay line 34, and its output connected to the input of the first delay line 28. The gain of each amplifier, 37 and 39, is such that the combined transfer function of a delay line, 28 or 34, and its associated amplifier, 37 or 39, is equal to approximately one.

Discussing more fully the theory behind the embodiment 10 shown in FIG. 1, and the embodiment 40 shown in FIG. 2, the desired signal is the sequence $J_{-\nu}(k)$, . . . , $J_{-1}(k)$, $J_0(k)$, $J_1(k)$, . . . , $J_\nu(k)$, where k is a constant.

The recursion relation with respect to Bessel functions which is used is: $J_{\nu+1}(z) + J_{\nu-1}(z) = (2\nu/z)\,J_\nu(z)$. The integral order $\nu$ rather than the argument $z$ is the dependent variable in cases of interest in this invention.

In FIG. 1 the blocks labelled 28 and 34 are analog delay lines, while in FIG. 2, the blocks labelled 58 and 64 are shift registers. For an implementation using increasing $\nu$, initial conditions $J_{-\nu+1}(z)$ and $J_{-\nu}(z)$ are supplied at points B and C, respectively, of both figures. The first term to appear at point A will then be $J_{-\nu+2}(z)$. Subsequent terms will correspond to increasing values of $\nu$. The initial value of $\nu$ in the block, 14 or 44, marked "$(2\nu/z)$ MULTIPLIER" in this case will be $\nu=1-\nu$ and will be increased by 1 on each successive iteration.

To give an example of specific values or $\nu$, and referring to FIG. 1, assuming a value of $-100$ for $\nu$, $J_{-100}(z)$ and $J_{-99}(z)$ may be determined from a table, for any convenient value of the argument $z$. The values are then inserted into the Bessel signal generator 10 at points B and C respectively. The $J_{-100}(z)$ signal is multiplied by a factor of $200/z$ in multiplier 14, and inserted into the summer 22 without any delay, and the $J_{-99}(z)$ signal is also inserted into the summer without a delay, but with an inversion of the signal in inverter 18. The foregoing represents the first propagation of the inserted signals, $J_{-100}(z)$ and $J_{118\ 99}(z)$, to result in a $J_{-98}(z)$ at the output of the signal summer 22.

After the first propagation of signals, the delay lines 28 and 34 come into use. The $J_{\nu+1=-100}$ and $J_{\nu=-100}$ signals propagating to the right transverse the left and right delay lines 34 and 28, with an equal delay time, the indices for $\nu$ thereby advancing by one.

In FIGS. 1 and 2, to obtain values of the Bessel functions of the first kind which have a decreasing value of order $\nu$ merely requires different initial conditions.

For an implementation in decreasing $\nu$, for use in convolvers, for example, initial conditons $J_{\nu+1}(z)$ and $J_\nu(z)$ are supplied at points C and B respectively. The first term at point A will then be $J_{\nu-1}(z)$. Subsequent terms will correspond to decreasing values of $\nu$.

The initial value of $\nu$ in the block 14 marked "$2\nu/z$ MULTIPLIER" in this case must be $\nu$ and will be decreased by 1 on each successive iteration. The block marked 14 multiplies the quantity at poitt B by a magnitude $2\nu/z$ before introducing it into the summation in summer 22. The $\nu$ index control 32 is so designed that it supplied the correct value of $\nu$ for each iteration whether $\nu$ is increasing or decreasing.

A useful modification of the invention is possible. Since $\nu$ is an integer and $z$ is a parameter which can be chosen in designing the signal, the implementation may be simplified even further for some choices of $z$. In particular if $z=2^j$, where $j$ is a positive integer, then the implementations 70 and 100 of FIGS. 3 and 4 are possible.

The embodiment 70 shown in FIG. 3 relates to the implementation of an algorithm which includes a power of 2, using two shift registers, 72 and 74, and an accumulator register 76. Initial conditions are set, $J_0$, $J_1$, etc. may be taken from a table, the value of the desired argument $2^j$ is chosen, inserted into the algorithm and the function may then be determined.

Initial conditons for the implementation 70 of FIG. 3 are placed in the two shift registers, 72 and 74, and in a register to store the index $\nu$ 78. Implementation for either increasing or decreasing $\nu$ can be selected by a choice of initial conditions as in the case of the embodiment 10 shown in FIG. 1.

As before, the output can be taken from points A, B, or C as desired. These outputs are simultaneously available and correspond to three adjacent one-unit shifts of the signal.

Initially, the correct value of $\nu$ must be inserted into the $\nu$ index control, 32 or 62, of FIGS. 1 or 2 or the $\nu$ index register 78 of FIG. 3. Thereafter, the logical circuitry ensures that $\nu$ increases or decreases, in synchronism with the shifting of the $J_\nu$ values.

The factor of $\nu$ in the term $(2\nu/z)$ accounts for the phrase in FIG. 3: ADD $\nu$ TIMES IN EACH ITERATION. If the current value of $\nu$ is five, $J_\nu(2^j)$ is added five times during each iteration. $\nu$ is not indexed to a new value, 6 or 4, of $\nu$ until the five iterations are completed.

In FIG. 3, the $\nu$ index register 78 stores the values of $\nu$ and inserts them into the accumulator register 76. The value of $J_\nu(2^j)$ is added $\nu$ times in each iteration, and the value of $\nu$ is indexed for the next iteration. The offset 82 to the right by $j-1$ bits is equivalent to dividing $2^j$ by 2.

With respect to the offset of $j-1$ bits in FIG. 3, the amount of offset is derived as follows.

In the non-digital embodiment 10 of FIG. 1 and in the digital embodiment 40 of FIG. 2, the multiplication is by a factor of $(2\nu/z)$. For the apparatus 70 shown in FIG. 3 and the apparatus 100 shown in FIG. 4, the quantity $z$ is equal to $2^j$. Therefore, the factor $(2\nu/z)$ becomes $(2\nu/2^j) = (\nu/2^{j-1})$.

Shifting by j bits, where $z = 2^j$, is equivalent to dividing by a factor of $z$. But division is not done by $z$ but by $(½)\ z$ since $(2\nu/z) = (\nu/½\ z)$. The extra factor of ½ is what makes the shift $j-1$ units rather than $j$ units.

Whatever argument of $2^j$ is used, the offset is $j-1$ bits, so that the specific power of 2, namely $j$, which is chosen for the argument $z$ is related to the amount of offset.

When a quantity is added $\nu$ times in each iteration, that is equivalent to multiplying by $\nu$, but since there is an offset of $j-i$ bits, that corresponds to a division of $\nu$ by $2^{j-1}$. Because of this, in FIG. 3 the need for a multiplier is avoided by using a simple accumulator register 76. Essentially the accumulator register 76 comprises a simple conventional adder, which adds the $J_\nu(2^j)$ signal each time that a control pulse arrives at its input, and a circuit that generates $\nu$ control pulses at each iteration and is driven by the $\nu$ index register 78.

Referring now to FIG. 4, therein is shown an apparatus 100 for the generation of a sequence of Bessel function signals $J_\nu(2^j)$, of the first kind, of constant argument $2^j$ and successive integral order $\nu$, comprising a first shift register 102 having N stages, for shifting N bits, and a second shift register 104, also having N stages, for shifting N bits, whose output is connected to the input of the first shift register. The function of the first and second shift registers, 102 and 104, is to store and reorder signal samples in binary form to be used in a succeeding Bessel sequence.

A first switching means 106 is connected to the first shift register 102, for inserting an initial binary number into it.

The first switching means 106 is shown as having four control bars 106B. The sequence of three dots at the position of one of the bars indicates that a chosen number of control bars 106B may be used, the number of control bars generally being equal to the number of bits N in its associated shift register, 102 in this instance.

However, the number of control bars 106B does not necessarily have to be equal to N, because the shift registers are longer, that is, have more stages, than the number of bits in a digital signal, since they have to be capable of handling the largest number that occurs during an operation, which may not be the number that appears at the start of the operation. A second switching means 108 is connected to the second shift register 104 for inserting an initial binary number into it. A third switching means 109 is connected to the output stages of the first shift register 102.

An accumulator 111 has as one set of inputs the binary bits from the second shift register 104 which correspond to the least significant digits, and as another set of inputs the least significant digits from the first shift register 102 after being shifted $j-1$ bits away from the least significant digit by the third switching means 109.

A third shift register 113 has its input stages connected to the output of the accumulator 111 and its output connected to the input of the second shift register 104.

A $\nu$ register 115 keeps track of the number $\nu$. A fourth switching means 117 is connected to the $\nu$ register 115 for inserting the proper number $\nu$ into it. The 4th switching means 117, which may be a multipole switch, is a convenient way of choosing the $j-1$ offset for a given value of $j$.

The first, second, and fourth switching means, 106, 108 and 117 set up the desired numbers in their respective registers, 102, 104, and 115, when the operation is initiated. There is a separate start switch 123 for convenience. The switching means may be digital thumbwheel switches with binary outputs.

A clock and timing control 119 is connected to and controls the flow of the binary bits in the three shift registers 102, 104, and 113, and the accumulator 111. The clock and timing control 119 also has inputs from and an output to the $\nu$ register 115.

In some embodiments, the delay lines may be analog delay lines which do not require a clock. The index control would have to be synchronized in some manner with the delay lines, by synchronizing pulses developed from the analog signals traversing the delay lines, for example. A stable oscillatory system must be present, for example as in a differential analyzer circuit or a feedback network.

A sync signal is required for an analog delay line if a charge-transfer device were used. When a charge-transfer device is used, it has to be stepped along just like a shift register.

An analog delay line could be a combination of an amplifier and perhaps just a block of quartz of the correct length, or of zero-temperature coefficient glass.

If the delay lines include shift registers, as in FIGS. 2, 3 and 4, then a timing or clocking source must be used in conjunction with the apparatus of this invention.

A logic level source 121, which develops bilevel voltages, is connected to, and feeds the proper bilevel voltages to the first, second and fourth switching means, 106, 108, and 117, and the clock and timing control 119.

The logic level source 121 may generate two voltage levels, for example of zero volts and five volts, and then causes either of these two voltage levels to appear at the proper stages of the first and second shift registers, 102 and 104 or at the $\nu$ register 115, so that the proper initial binary numbers appear at these registers. So that, instead of providing a signal source, as in FIGS. 1 and 2, a number is provided corresponding to the initial starting point.

The output of the $\nu$ register, 115, through the clock and timing control 119, causes the second shift register 104 to discharge its contents into the accumulator 111 $\nu$ times simultaneously with the subtraction of the contents of the first shift register 109, the result of the two operations resulting in a binary number which is fed into the third shift register 113 and then into the second shift register 104; at which point the number $\nu$ increases or decreases by one. The apparatus 100 would generally further comprise a start switch 123 which controls the output of the logic level source 121.

As soon as the three switching means, 106, 108 and 117, are set up correctly, the start switch 123 is energized to cause the logic level voltage from logic level source 121 to conduct through the three switching means to set up the various stages of the registers, 102, 104, and 115, in their proper binary states, and then start the clock and timing cntrol 119 to let the generator 100 proceed to generate the Bessel sequences henceforth.

It will be noted that, whereas in the embodiment 70 shown in FIG. 3 the offset of $j-1$ bits applies to the output of the second shift register 74, there is a somewhat different, although equivalent, implementation in FIG. 4. In FIG. 4 the output of the second shift register 104 goes directly to the accumulator 111 without any apparent offset. At the output of the second shift register 104, the bits are put toward the less significant bits. Since it is desired to use the accumulator 111 efficiently, the least significant bit after the shift is always put at the low end of the register (not specifically shown) of the adder or accumulator 111. So that by putting the low end there permanently and shifting the output of the first shift register 102, in the other direction, there is obtained the same effect as in FIG. 3, with most efficient use of the accumulator 111 with the specific implementation shown.

FIG. 5 shows important timing pulses for the Bessel function generator 100 shown in FIG. 4. FIGS. 5A, 5B, and 5C are more or less self-explanatory. With respect to FIG. 5D, on the line marked SHIFT REGISTER CONTROL, the purpose of the group of pulses is to indicate that the address occurs at the clock rate rather than simultaneously. It is a little simpler to implement in the type of hardware used in the embodiment 100 shown in FIG. 4.

The integrated circuits now being marketed for use in digital differential analyzer applications would be quite convenient for some digital implementations of FIG. 3. Charge transfer devices would provide a good realization of the delay lines in analog implementation 10 of FIG. 1. Digital thumbwheel switches with binary output would be convenient to use for the first, second and fourth switching means, 106, 108 and 117 of FIG. 4, while a multipole rotary switch would be convenient for the third switching means 109.

Obviously many modifications and variations of the present invention are possible in the light of the above teachings. It is therefore to be understood that within the scope of the appended claims the invention may be practiced otherwise than as specifically described.

What is claimed is:

1. Apparatus for the generation of Bessel function signals $J_\nu(z)$ of the first kind, of constant argument z and successive integral order $\nu$, comprising:

a first signal source capable of generating signals of arbitrary amplitude $J_\nu(z)$, where $z$ is a constant;

means connectable to the signal source for multiplying the values of $J_\nu(z)$ by the quantity $(2\nu/z)$;

a second signal source capable of generating signals of amplitude $J_{\nu-1}(z)$;

an inverter connected to, and for inverting a signal at, the output of the second signal source;

the transit time of the $J_\nu(z)$ signal traversing the multiplying means being substantially equal to the transit time of the $J_{\nu-1}(z)$ signal traversing the inverter; the apparatus further comprising:

a summing circuit, whose two inputs are the output of the multiplying means, $(2\nu/z)J_\nu(z)$, and the output of the inverter, $-J_{\nu-1}(z)$, the output of the summing circuit thereby being $2\nu/z\ J_\nu(z) - J_{\nu-1}(z)$, which is equal to $J_{\nu+1}$.

2. The apparatus according to claim 1, further comprising:

a first and a second normally open switching means, each having an input and an output, whose inputs are connected to the outputs of the first and second signal sources, respectively;

a first delay line whose input is connected to the output of the first switching means and whose output is connected to the output of the second switching means, the $J_\nu(z)$ signal generated by the first signal source, after traversing the first switching means and the delay line, replacing the $J_{\nu-1}(z)$ signal at the output of the delay line;

a $\nu$ index control, for generating successive integral values, either increasing or decreasing, or the order $\nu$, the output of the control being connected to the multiplying means;

the multiplying means thereby multiplying the values of $J_\nu(z)$ by the factor of $(2\nu/z)$ where $\nu$ changes by one unit for each successive multiplication;

a second delay line, whose input is connected to the output of the summing circuit and whose output is connected to the input of the first delay line, the $J_{\nu+1}(z)$ signal at the output of the summing circuit, after traversing the second delay line, replacing the $J_\nu(z)$ signal at the input of the first delay line;

means for timing the sequence of operations of the apparatus, including generally in the order enumerated:

1. momentarily energizing the first signal source;
2. momentarily energizing the first switching means;
3. momentarily energizing the second signal source;
4. at approximately the same time, momentarily energizing the second switching means;
5. indexing the $\nu$ index control at a time such the signal $-J_{\nu-1}(z)$ at the output of the inverter and the $(2\nu/z)J_\nu(z)$ signal at the output of the multiplying means appear simultaneously at the input to the summing circuit;

with the result that the new output of the summing circuit becomes a $J_{\nu+2}(z)$ signal at the completion of one transversal of the Bessel function signals through the delay lines;

and becomes a $J_{\nu+3}(z)$, $J_{\nu+4}(z)$, . . . , etc., signal with each successive indexing of the $\nu$ index control;

without the necessity of again energizing the first or second signal sources or the first or second switching sources;

the apparatus thereby serving as a recursive generator of Bessel function signals $J_\nu(z)$ of the first kind, of constant argument $z$, and successive integral order $\nu$.

3. The apparatus according to claim 2, wherein the first and second signal sources generate digital signals; the first and second delay lines are shift registers; and the $(2\nu/z$multiplier is a digital multiplier.

4. The apparatus for the generation of a sequence of Bessel function signals $J_\nu(2^j)$, of the first kind, of constant argument $2^j$ and successive integral order $\nu$, comprising:

a first shift register, having N stages, for shifting N bits;

a second shift register, also having N stages, for shifting N bits, and whose output is connected to the input of the first shift register;

the function of the first and second shift registers being to store and reorder signal samples in binary form to be used in a succeeding Bessel sequence;

a first switching means, connected to the first shift register, for inserting an initial binary number into it;

a second switching means, connected to the second shift register, for inserting an initial binary number into it;

a third switching means, connected to the output stages of the first shift register;

an accumulator having as one sets of inputs, the binary bits from the second shift register which correspond to the least significant digits, and as another set of inputs the least significant digits from the first shift register which however are shifted j—1 bits away from the least significant digit by the third switching means;

a third shift register, whose input stages are connected to the output of the accumulator and whose output is connected to the input of the second shift register, facilitating transfer of signal samples from the accumulator to the second shift register;

a $\nu$ register which keeps track of the number $\nu$;

a fourth switching means, connected to the $\nu$ register, for inserting the number $\nu$ into it;

a clock and timing control, connected to, and for controlling the flow of the binary bits in, the three shift registers and the accumulator;

the clock and timing control also having an input from the $\nu$ register; and a logic level source, which develops bilevel voltages, connected to, and which feeds the proper bilevel voltage to, the first, second, third and fourth switching means and the clock and timing control;

the output of the $\nu$ register causing the second shift register to discharge its contents into the accumulator $\nu$ times simultaneously with the subtraction of the contents of the first shift register, the result of the two operations resulting in a binary number which is fed into the third shift register and then into the second shift register.

5. The apparatus according to claim 4, further comprising: a start switch which controls the output of the logic level source.

* * * * *